United States Patent
Wagner

(10) Patent No.: US 10,742,341 B2
(45) Date of Patent: Aug. 11, 2020

(54) CONTROL UNIT, SYSTEM AND METHOD FOR SENDING AND RECEIVING RADIO SIGNALS IN SEVERAL FREQUENCY RANGES

(71) Applicant: Kathrein-Werke KG, Rosenheim (DE)

(72) Inventor: Christian Wagner, Rosenheim (DE)

(73) Assignee: KATHREIN SE, Rosenheim (DE)

( * ) Notice: Subject to any disclaimer, the term of this patent is extended or adjusted under 35 U.S.C. 154(b) by 85 days.

(21) Appl. No.: 15/015,928

(22) Filed: Feb. 4, 2016

(65) Prior Publication Data

US 2016/0233973 A1 Aug. 11, 2016

(30) Foreign Application Priority Data

Feb. 10, 2015 (DE) .................. 10 2015 001 677

(51) Int. Cl.
| | |
|---|---|
| H04J 1/08 | (2006.01) |
| H04J 1/16 | (2006.01) |
| H04B 7/155 | (2006.01) |
| H04B 1/40 | (2015.01) |

(52) U.S. Cl.
CPC .............. *H04J 1/085* (2013.01); *H04B 1/40* (2013.01); *H04B 7/15528* (2013.01); *H04J 1/16* (2013.01)

(58) Field of Classification Search
CPC ............... H04J 1/16; H04J 1/085; H04B 1/40
See application file for complete search history.

(56) References Cited

U.S. PATENT DOCUMENTS

| | | | |
|---|---|---|---|
| 7,035,609 B1* | 4/2006 | Fry ................ | H04B 1/0458 455/129 |
| 8,688,033 B2 | 4/2014 | Seeor et al. | |
| 2009/0260049 A1* | 10/2009 | Urbanek .............. | H04N 7/102 725/125 |

(Continued)

FOREIGN PATENT DOCUMENTS

| | | |
|---|---|---|
| DE | 10 2012 006 362 | 10/2013 |
| EP | 2340683 | 11/2012 |
| WO | 2011086921 | 7/2011 |

OTHER PUBLICATIONS

Extended European Search Report issued in Appl. No. 16153997.8 dated Jun. 23, 2016.

(Continued)

*Primary Examiner* — Zhensheng Zhang

(74) *Attorney, Agent, or Firm* — Niels Haun; Dann, Dorfman, Herrell & Skillman

(57) ABSTRACT

A distributed antenna system for transceiving radio signals in several frequency ranges is described. The system comprises a control unit with at least one first port for forwarding first radio signals in a first frequency range and one second port for forwarding second radio signals in a second frequency range. A plurality of remote units is connected to the control unit via a distributor network. The remote units have first antenna elements for transceiving the radio signals in the first frequency range and second antenna elements for transceiving the radio signals in the second frequency range. The control unit comprises a modulator for converting the second radio signals to a further frequency range and the remote units have a demodulator for converting the second radio signals from the further frequency range to a different frequency range.

7 Claims, 5 Drawing Sheets

(56) References Cited

U.S. PATENT DOCUMENTS

| | | | |
|---|---|---|---|
| 2010/0113097 A1 | 5/2010 | Seeor et al. | |
| 2013/0058281 A1* | 3/2013 | Berlin | H04W 4/20 370/328 |
| 2014/0274044 A1* | 9/2014 | Lee | H04W 48/16 455/434 |
| 2014/0293894 A1* | 10/2014 | Saban | H04W 88/085 370/329 |

OTHER PUBLICATIONS

German Search Report issued in DE Application No. 10 2015 001 677.6 dated Sep. 18, 2015.

\* cited by examiner

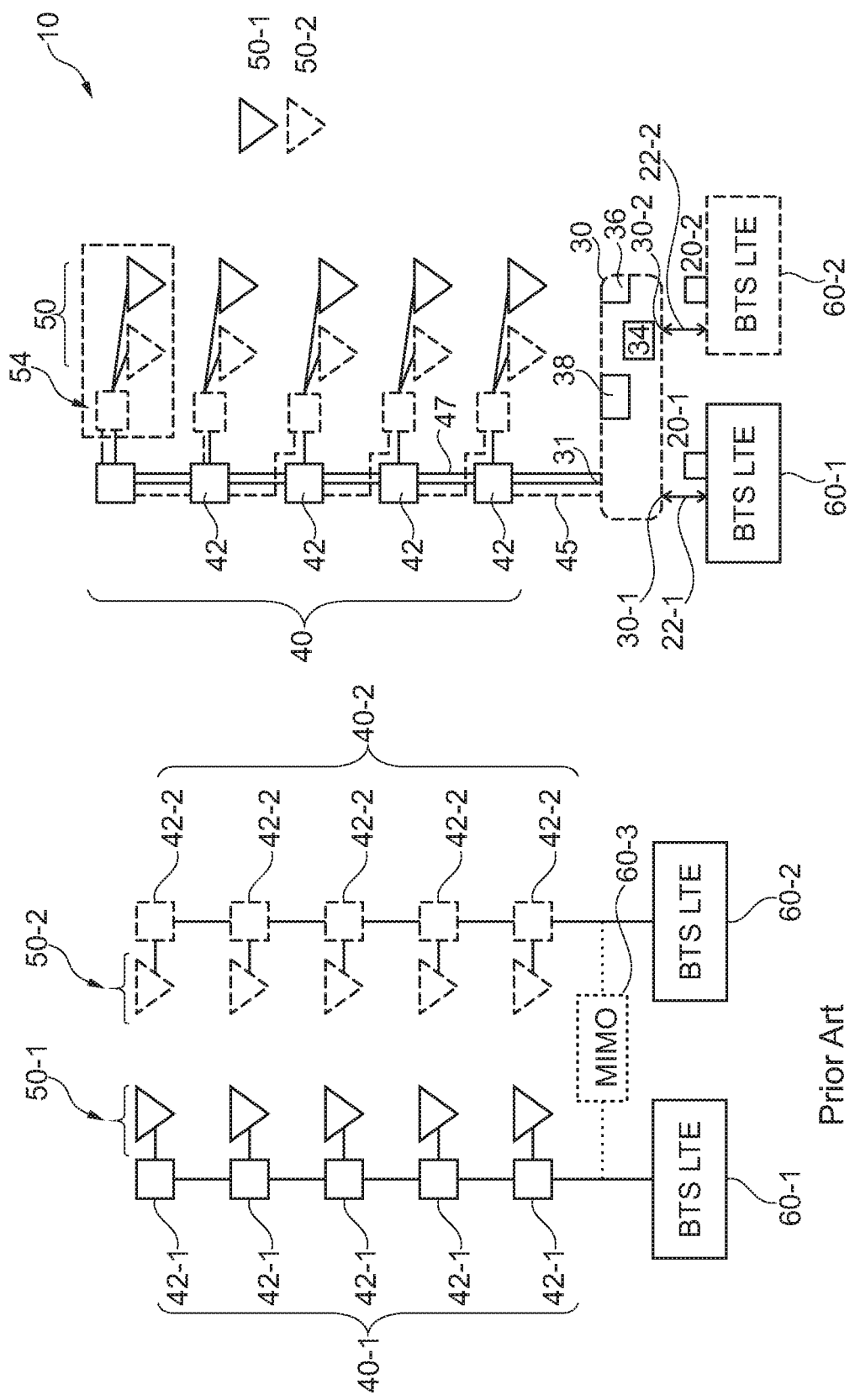

CONTROL UNIT, SYSTEM AND METHOD FOR SENDING AND RECEIVING RADIO SIGNALS IN SEVERAL FREQUENCY RANGES

CROSS-REFERENCE TO RELATED APPLICATIONS

This application claims priority to and benefit of German Patent Application No. 10 2015 001 677.6 entitled: "CONTROL UNIT, SYSTEM AND METHOD FOR SENDING AND RECEIVING RADIO SIGNALS IN SEVERAL FREQUENCY RANGES" filed on 10 Feb. 2015, the disclosure of which is incorporated in its entirety in this application.

FIELD OF THE INVENTION

This invention relates to a system and method for transceiving (sending and receiving) radio signals in several frequency ranges in a DAS system (distributed antenna system).

BACKGROUND OF THE INVENTION

DAS systems serve to distribute radio signals in buildings or in other contiguous areas, such as a university campus or company campus, shopping centers, pedestrian zones, stadiums, hospitals, etc. In DAS systems an identical radio signal is radiated in different locations. A distinction is made in the industry between so-called passive and active DAS systems. In a passive DAS system, the RF signal from a base station is supplied to the antennas via coaxial connections and via splitters and tappers. Active DAS system have an active distribution of the signals over large distances, e.g. via coaxial cables, subsequent to which the signals are then distributed by a further coaxial installation to various passive or active antennas.

A conventional passive DAS system for transceiving radio signals from a mobile communication provider is represented on the left side of FIG. 1. The left side of FIG. 1 shows a first base station 60-1 connected to a plurality of antenna elements 50-1 via a distribution system or distributor network 40-1. The antenna elements 50-1 are connected to the distributor network 40-1 via a splitter or tapper 42-1. The radio signals from the base station 60-1 are forwarded and transmitted via the distributor network 40-1 to the antenna elements 50-1 via the splitters/tappers 42-1.

In order to take into account current broad-band requirements, LTE works for example with several parallel input and output signals. This technology is referred to as MIMO (multiple input multiple output). In order to implement a MIMO system, it is required in a conventional installation to provide further, parallel distributor paths and distributor connections and to install an additional antenna infrastructure, as shown on the right-hand side of FIG. 1.

The right-hand side of FIG. 1 shows a second base station 60-2 for the LTE signals, which is likewise connected to several second antenna elements 50-2 via a second distributor network 40-2. The second radio signals are forwarded from the second base station 60-2 via the second distributor network 40-2 and the splitters/tappers 42-2 to the second antenna elements 50-2 and transmitted. The effort to install this additional antenna infrastructure is substantial, since the second distributor network 40-2 must be laid for example across fire-protection sections and through ceilings and walls. The second radio signals cannot be transmitted via the existing first distributor network 40-1, since the second radio signal are either two radio signals working in the same frequency range or the first distributor network 40-1 is not configured for the frequency range of the second radio signals.

In the discussion above, FIG. 1 also shows a further known embodiment with a MIMO architecture. For the sake of simplicity, for the representation of the MIMO architecture a third base station 60-3 has been added (shown as dashed lines). Typically, the two MIMO channels are implemented within the base station 60-3 and connected to the two distributor networks 40-1 and 40-2. In the MIMO architecture the first base station 60-1 and the second base station 60-2 are not present. This MIMO architecture also requires the second distributor network 40-2 with the disadvantages described above.

An international patent application No. WO 2011/086921 (Panasonic Corporation) is known in the art, which discloses a so-called relay device for forwarding radio signals via a distributor network. The distributor network in this international application comprises a converter that converts all incoming radio signals from one frequency to a different frequency, so that the radio signals can be transmitted via the distributor network, and a second converter that converts the transmitted signals back to the original frequency.

BRIEF SUMMARY OF THE INVENTION

A control unit for forwarding radio signals in several frequency ranges is described. The control unit comprises at least one first port for forwarding first radio signals in a first frequency range and one second port for forwarding second radio signals in a second frequency range that is different from the first frequency range. This second frequency range can lie in the same, a partially overlapping frequency range as the first frequency range or in a further (non-overlapping) frequency range. The control unit has a third port for transmitting the first radio signals and the second radio signals via a distributor network which was originally configured for the transmission of radio signals in the first frequency range. A modulator in the control unit converts (or modulates) the second radio signals from the second frequency range to a further frequency range before the transmission to the distributor network, for which the distributor network is suitable (but possibly originally not configured therefore).

The control unit has a sensor which recognizes available or unoccupied (free) frequency ranges for the transmission of the radio signals in the distributor network and thus controls the modulator, so that the further frequency range can be chosen from the unoccupied frequency ranges or as a frequency range which contains at least partially unoccupied frequency ranges.

The distributor network is formed of coaxial cables in one aspect of the invention. The coaxial cable can be an already present coaxial cable and the control unit thus makes possible its further use also for transmitting the additional, second radio signals.

The control unit can be used in a system for transmitting radio signals. Such a system also forms the subject matter of the present invention.

The system comprises a plurality of remote units connected to the control unit via the distributor network, and first antenna elements for transceiving the first radio signals, as well as second antenna elements for transceiving the second radio signals. The remote units have a demodulator for converting the second radio signals from the further frequency range to a different frequency range of the transmission of signals (Tx signals).

In a further aspect, the remote units have a modulator for converting received signals (Rx signals) from a received frequency range to the further frequency range for transmission to the base station via the distributor network. In this aspect, the control unit has a demodulator for converting the received Rx signals from the further frequency range to the first frequency range or to the second frequency range for forwarding to the base stations.

The distributor network further comprises a control channel for transmitting control signals, using a frequency-division multiplex process between the modulator in the control unit and the demodulator in the antenna. The control signals can address the modulators and demodulators in the remote units or the remote units individually. Likewise, the distributor network can have a power channel for supplying the demodulator and/or the antenna elements/remote units.

A method for transceiving radio signals in several frequency ranges is also described. The method comprises a forwarding of first radio signals in a first frequency range via a distributor network between a first port and a plurality of remote units, a transceiving of the first radio signals in the plurality of remote units via antenna elements, a recognition of unoccupied frequency ranges in a signal spectrum on the distributor network, a demodulation and/or modulation of second radio signals received or to be sent via the antenna elements in a second frequency range to a further frequency range (different from the first frequency range) containing at least partially one of the recognized, unoccupied frequency ranges, and forwarding the modulated second radio signals between a modulator and a demodulator via the distributor network. Subsequently, a demodulation is effected of the previously modulated second radio signals, followed by a sending and/or a forwarding of the second radio signals from second antenna elements in the plurality of remote units.

As specified, the method comprises a recognition of unoccupied frequency ranges in the distributor network, as well as the recognition of the adaption of the frequency range in each case, such that the second radio signals can be transferred after modulation, while at least partially using frequency ranges that are recognized, unused and suitable in view of the adaption, such that interference with the first radio signals and substantial mismatch can be prevented.

By this system, the control unit and the method, an existing distributor network can be so configured or used that it additionally transmits such radio signals between the base station and a remote unit and/or and antenna element which could/would normally not be transmitted via the distributor network, since the distributor network is/was either already occupied in the frequency range or not configured therefore, at any rate a suitability for this purpose could not be ascertained so far.

For the sake of better understanding, the invention will now be explained in more detail with reference to an embodiment and drawings.

DESCRIPTION OF THE DRAWINGS

FIG. 1 shows a system according to the art.
FIG. 2 shows a system according to a first aspect of the invention.

DETAILED DESCRIPTION OF THE INVENTION

Figure 3:
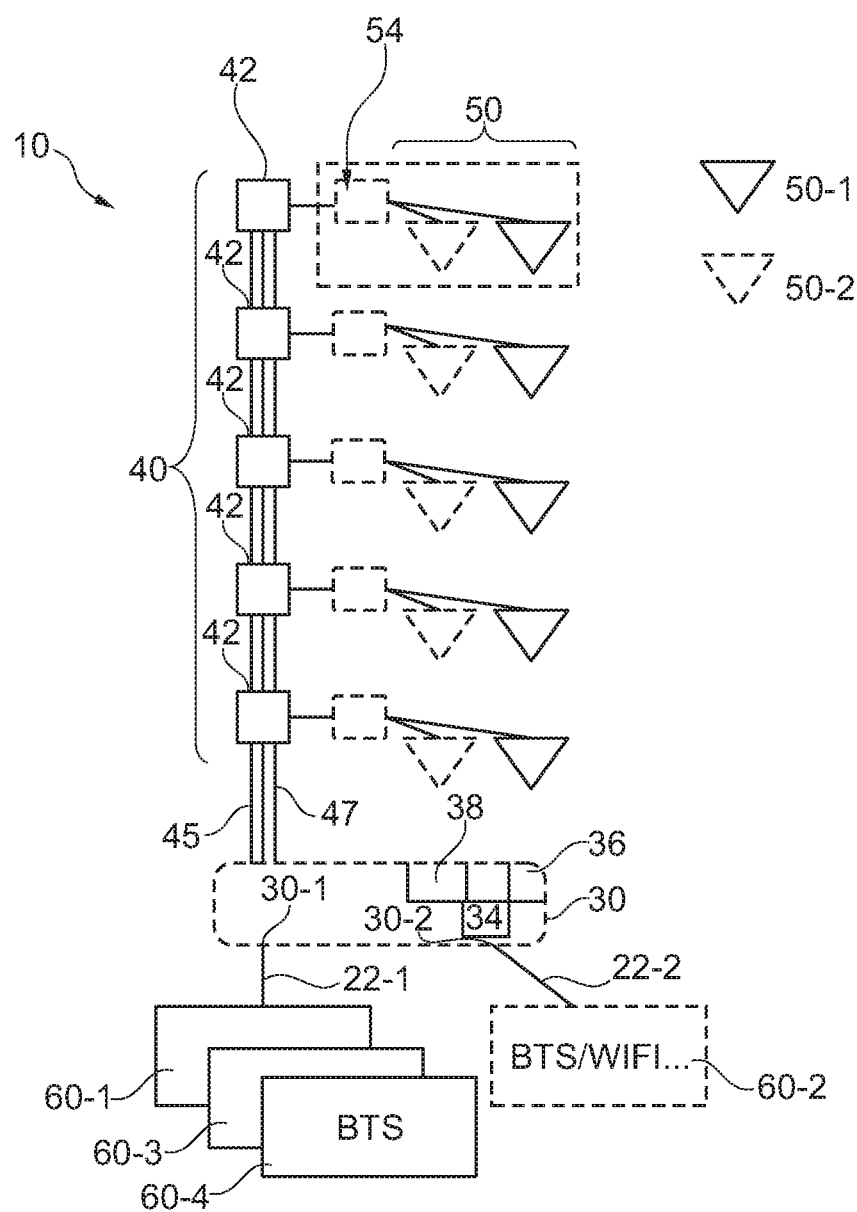
FIG. 3 shows a further aspect of the invention.

FIG. 2 shows a first aspect of a DAS system 10. The system 10 shows a first base station 60-1 and a second base station 60-2, which are each connected to a control unit 30 via a first line 22-1 or a second line 22-2. The two base stations 60-1 and 60-2 can also be the two MIMO channels of a MIMO base station. First radio signals 20-1 are received via the first line 22-1 at a first port 30-1 of the control unit 30 and second radio signals 20-2 are received via the second line 22-2 at a second port 30-2 of the control unit 30. The control unit 30 is connected to a distributor network 40 and thus remote units 50 and antenna elements 50-1 and 50-2 via a third port 31. The first line 22-1 and the second line 22-2 are bidirectional lines and therefore can transmit respectively the first radio signals 20-1 and the second radio signals 20-2 also in the reverse direction.

In one aspect, the distributor network 40 is formed by a conventional coaxial cable, which is already laid in a building and is now to be used for the DAS system 10. Such existing coaxial cables were, for example, originally laid for the transmission of radio signals using the GSM protocol, and are for example configured for radio signals in the following frequency ranges: 700-900 MHz or 1700-1900 (GSM mobile communication standard) or 1920-1990 or 2110-2170 MHz (UMTS mobile communication standard). These existing coaxial cables can partly transmit radio signals used by the LTE mobile communication standard or the LTE-MIMO protocol. However, there is the risk that some frequency ranges are dual occupied (like in a MIMO operation) or the coaxial cable in the distributor network 40 is not configured or even not at all suitable for a used frequency range (frequency-dependent adjustment). The third port 31 is configured as a coax connector.

In a non-limiting embodiment of the DAS system 10 the first radio signals 20-1 lie in a first frequency range for which the distributor network 40 was originally laid, e.g. radio signals according to the GSM protocol. The second radio signals 20-2 lie either in the same, an at least partially overlapping frequency range of the first radio signals 20-1 or in a different frequency range for which the distributor network 40 is basically unsuitable, or for which its suitability is/was not established. These second radio signals 20-1 can use for example any one of the following mobile communication protocols: GSM, UMTS, LTE, LTE-MIMO, DECT, IEEE 802.11.

The control unit 30 comprises a modulator or demodulator 34, a monitoring unit 38 and a sensor 36. The sensor 36 is so configured that it captures details of the usable signal spectrum on the distributor network 40 by means of a VSWR (voltage standing wave ratio) measuring method and recognizes available frequency ranges. The sensor 36 continuously forwards the parameters of the recognized unoccupied signal ranges as well as the usable frequency range to the monitoring unit 38. The monitoring unit 38 regularly checks these parameters and controls the modulator/demodulator 34 and the sensor 36 correspondingly. In one aspect, the sensor 36 scans occupied frequency ranges during the transmission of the first radio signals 20-1 on the distributor network 40 for determining unoccupied frequency ranges.

The modulator 34 is connected to the second port 30-2 and can modulate the second radio signals 20-2 to at least one of the recognized unoccupied and usable frequency ranges. One of the recognized unoccupied and usable frequency ranges is chosen for the transmission of the second radio signals 20-2. The modulator 34 receives the specifications of the unoccupied frequency ranges from the sensor 36. The monitoring unit 38 can check the coaxial cable of the distributor network 40 by means of the VSWR method and indicate errors.

The first radio signals 20-1 are forwarded to the remote units 50 via the distributor network 40 and sent via the first antenna elements 50-1. The antenna elements 50-1 are connected to the distributor network 40 via a splitter or tapper 42.

The second radio signals 20-2 are first received at the port 30-2 and forwarded to the modulator 34, where the second radio signals 20-2 are modulated to the chosen frequency range unoccupied by the first radio signals 20-1. Subsequently, the second radio signals 20-2 are forwarded to the remote units 50 on the chosen frequency range via the distributor network 40. The remote units 50 each have a demodulator 54 which modulates the received second radio signals 20-2 back to the original, second frequency range or to another frequency range. The demodulator 54 is connected to the second antenna elements 50-2 which transmits the second radio signals 20-2. The remote unit 50 also has a switching function and can switch the first radio signals 20-1 to the second antenna elements 50-2 and the further radio signals 20-2 to the first antenna elements 50-1.

The distributor network 40 also has a control channel 45 in the present embodiment. The control channel 45 transmits control signals for example from the control unit 30 to the remote units 50. In a different aspect, the control signals use a frequency-division multiplex process, whereby other protocols are thinkable. The remote unit 50 also uses the received control signals for switching the first radio signals 20-1 and the second radio signals 20-2 to the corresponding first antenna elements 50-1 and second antenna elements 50-2. The modulators 54 and remote units 50 can be addressed individually and the control units can use the corresponding addresses in order to transmit control commands to the incoming remote units 50 and the modulators 54. The distributor network 40 can likewise have a power channel 47 supplying the remote units 50 as well as the demodulators 54 with energy (so-called power-over-coax). The remote units 50 and the demodulators 54 can also be supplied with energy by an external power source.

In a further aspect, signals can also be received. In this aspect the element 54 is a modulator for converting the received signals (Rx signals) from the received frequency range to the chosen frequency range for transmission to the control unit 30 via the distributor network 40. The modulator 54 recognizes the free frequency ranges by means of the transfer of the parameters from the control unit 30. In this aspect, the element 34 in the control unit is a demodulator which receives the received radio signals from the distributor network 40 and demodulates or converts or modifies the received radio signals to the second frequency range for transmission to the second base station 60-2 or to the second channel in a MIMO architecture.

FIG. 3 shows a second aspect of the invention in which the first base station 60-1 is complemented by a third base station 60-3 and a fourth base station 60-4. The third base station 60-3 and the base station 60-4 can likewise receive or send further radio signals via the distributor network 40 without modulation or demodulation of the further radio signals. By the occupation of the transmission ranges on the distributor network 40, however, further frequency ranges are occupied, possibly making it more difficult for the sensor 36 to find an unoccupied frequency range for the second radio signals 20-2. If any one of the third base station or the forth base station 60-4 attempts to send (or receive) the further radio signals via an already occupied signal range in the signal spectrum on the distributor network 40, the sensor 36 can choose an alternative frequency range for the transmission of these further radio signals received from the third base station 60-3 and/or from the fourth base station 60-4. The modulator 34 modulates these received, further radio signals to the alternative frequency range. This aspect of the description shows the modularity of the DAS system 10, since the DAS system 10 can be quickly rearranged in accordance with the requirements of the network operator or mobile communication operator. It is thereby possible to ascertain the full available spectrum and use it optimally afterwards, by effecting a complete modulation/demodulation or a modulation/demodulation in order to be able to use free ranges complementarily.

Figure 4A:
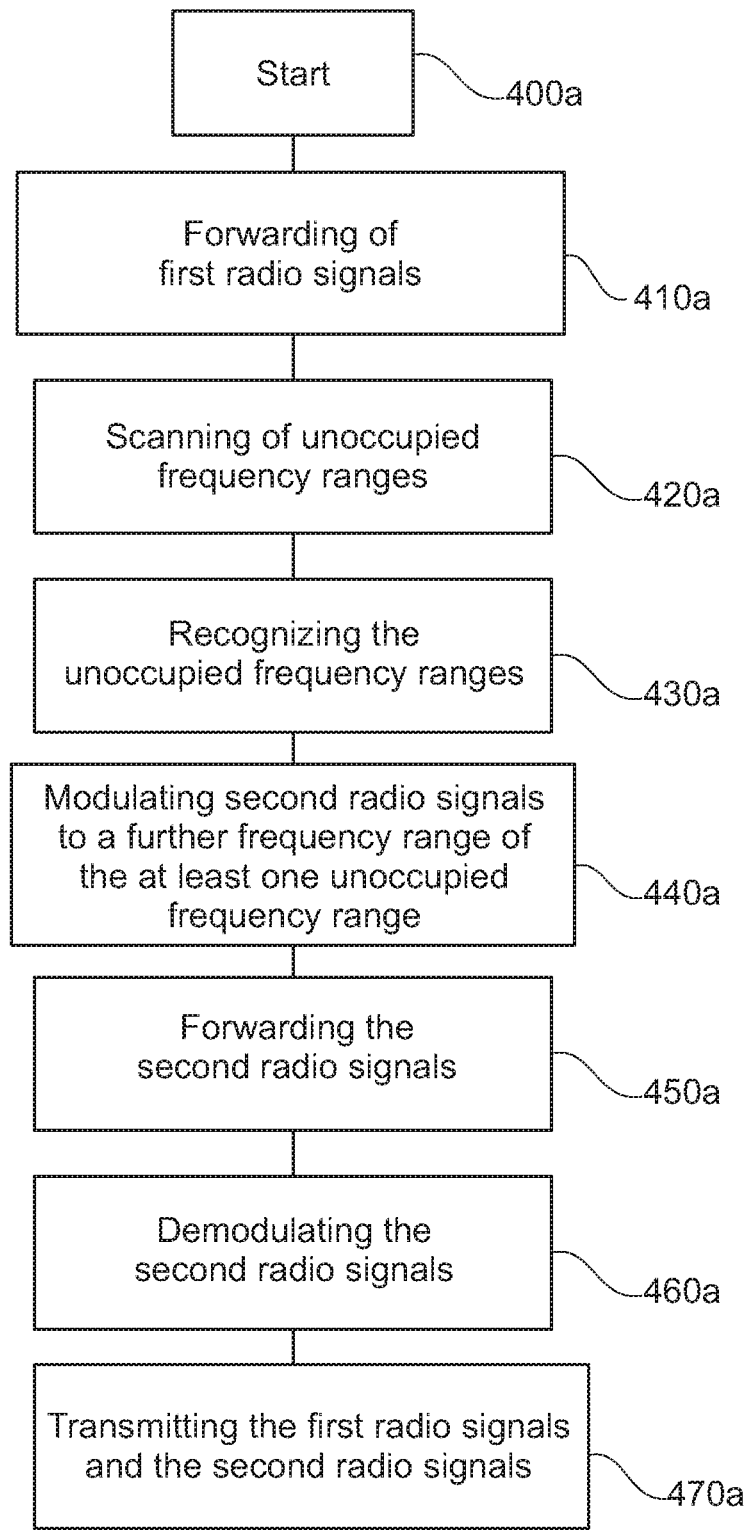
FIGS. 4A and 4B show the method for forwarding first radio signals and second radio signals.

FIG. 4A shows the sequence of a method according to the invention for transmitting the radio signals, which starts at the element 400. The first radio signals 20-1 are forwarded in step 410a from the first base station 60-1 via the control unit 30, via the distributor network 40 and subsequently via the splitters/tappers 42 to the remote units 50 for sending or receiving via the first antenna elements 50-1. In step 420a details of the unoccupied frequency ranges on the distributor network 40 are captured by scanning the signal spectrum and recognized in step 430a. In step 440a the second radio signals 20-2 from the second base station 60-2 are modulated by the modulator 34 to one of the unoccupied frequency ranges recognized in step 430a and afterwards forwarded via the distributor network 40 in step 450a.

The demodulator 54 receives the information about the modulated, second frequency signals 20-2 via the control channel 45 and in step 460a modulates the second frequency signals to a frequency for sending via the second antenna elements 50-2. The second radio signals 20-2 are transmitted together with the first radio signals 20-1 in step 470a. As mentioned above, the method works in the reverse direction for forwarding received radio signals to one of the corresponding base stations 60-2, 60-3 or 60-4.

Figure 4B:
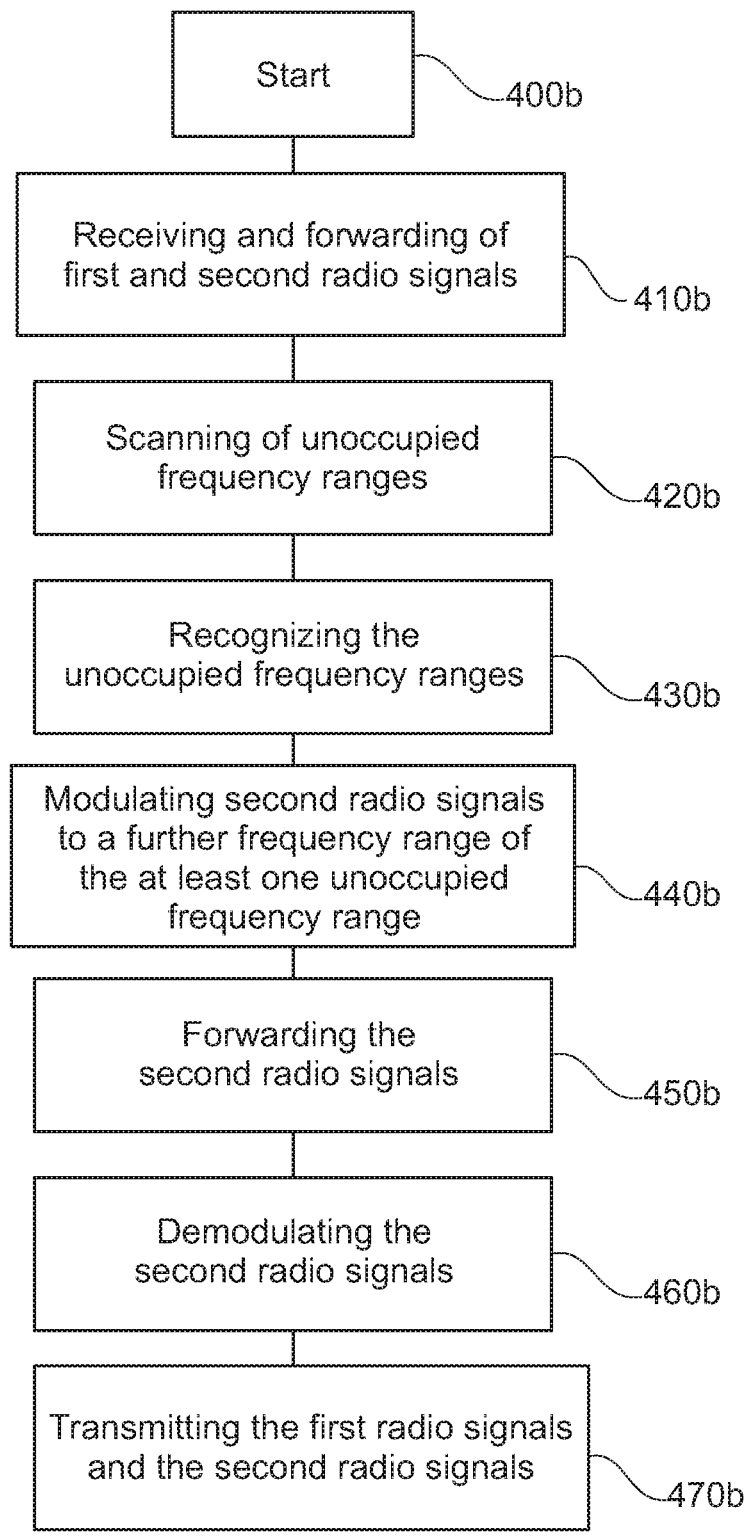

FIG. 4B shows the receipt of the first radio signals via the antenna elements 50-1 and 50-2. This method starts at 400b and in step 410b the first radio signals are received at the first antenna elements 50-1 and forwarded to the control unit 30 via the distributor network 40. In step 420b details of the unoccupied frequency ranges on the distributor network 40 are captured by scanning the signal spectrum and recognized in step 430b.

The second radio signals are received via the second antenna elements 50-2 and in step 440b are modulated by the modulator 54 to one of the unoccupied frequency ranges of the distributor network 40. The second radio signals are subsequently forwarded to the control unit 30 in step 450b. In the demodulator 34 the second radio signals are demodulated in step 460b. The first radio signals and the second radio signals are subsequently forwarded to the corresponding base station 60-1 or 60-2 or via the channels of a MIMO architecture.

Figure 5:
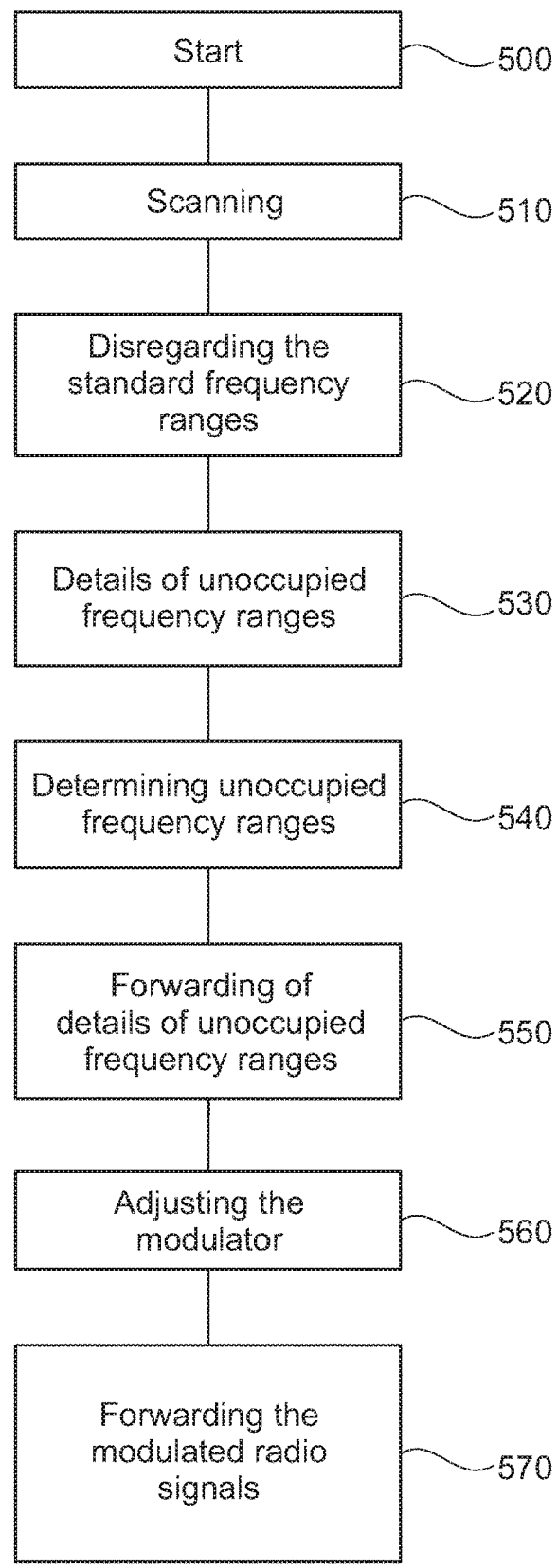
FIG. 5 shows a method for detecting an unoccupied frequency range in a system.

The sequence of detecting the suitable/unoccupied frequency range in the signal spectrum in an existing installation is represented in FIG. 5. The sequence starts at step 500. In step 510 the scanning is carried out via an integrated VSWR measuring device. It can be advantageous during this scanning that the so-called standard frequency ranges are not considered or disregarded (step 520). These standard frequency ranges are those frequency ranges which are defined a priori, for example by the network operator or a rule, and are not available for transmitting the second radio signals 20-2. In step 530 then details of the occupied frequency ranges are captured by the scanning and in step 540 the unoccupied frequency ranges in the distributor network 40 are determined and in step 550 the specifications of the unoccupied frequency range are forwarded to the modulator 34. The modulator 34 is subsequently adjusted in step 560. Afterwards, the forwarding of the modulated second radio signals 20-2 can be continued in step 570.

In an additional aspect, it would also be possible to adjust the first radio signals in the frequency spectrum by means of modulation/demodulation, in order to create free ranges for other transmissions of the further radio signals, however this would entail a substantial effort, since further demodulators would have to be installed in the existing infrastructure. In such an aspect, rather the complete available frequency spectrum would probably be used by means of the modulator(s)/demodulator(s) to be added.

Although the present invention was described in its entirety above with reference to exemplary embodiments, the person skilled in the art will recognize that individual features described in connection with one embodiment can also be combined in isolation or in combination with features of other embodiments, even if this was not described explicitly as an extra embodiment. The subject matter of the application is defined by the enclosed claims.

The invention claimed is:

1. A distributed antenna system for transceiving radio signals in several frequency ranges, comprising:
    a control unit for forwarding first radio signals and second radio signals; and
        a plurality of remote units for mobile communication, the plurality of remote units being connected to the control unit via a distributor network;
wherein the first radio signals are received via a first line at a first port of the control unit and the second radio signals are received via a second line at a second port of the control unit, the control unit being connected to said distributor network and remote units and antenna elements via a third port, wherein the first line and the second line are bidirectional lines and therefore can transmit respectively the first radio signals and the second radio signals also in the reverse direction,
wherein the control unit comprises:
    at least one first port for forwarding the first radio signals in a first frequency range and one second port for forwarding the second radio signals in a second frequency range,
    wherein the first frequency range lies in a frequency range available in the distributor network, and the second frequency range lies at least partially in a frequency range unusable in the distributor network;
    a third port connectable to the distributor network;
    a sensor for recognizing available frequency ranges in the distributor network; and
    a modulator/demodulator in order to convert, upon transmission of the second radio signals via the distributor network, the second radio signals to or from a further frequency range, said further frequency range being different from the first frequency range, and which contains at least partially at least one of the available frequency ranges;
wherein the remote units have at least one further demodulator/modulator for converting the second radio signals from the further frequency range to a different frequency range.

2. The system according to claim 1, wherein the distributor network has a control channel for transmitting control signals between the modulator/demodulator and at least one of the remote units or the further demodulator/modulator.

3. The system according to claim 2, wherein the control signals use a frequency-division multiplex process.

4. The system according to claim 1, wherein the distributor network is formed of a coaxial cable.

5. The system according to claim 4, wherein the coaxial cable is configured for the transmission of power.

6. The system according to claim 1, wherein the plurality of remote units has first antenna elements for transceiving the first radio signals and second antenna elements for transceiving the second radio signals.

7. The system according to claim 1, wherein at least one of the plurality of remote units, the modulators/demodulators, the first antenna elements or the second antenna elements can be addressed individually.

* * * * *